US012774911B2

(12) United States Patent
Marath Sankarathodi et al.

(10) Patent No.: US 12,774,911 B2
(45) Date of Patent: Oct. 27, 2026

(54) METHODS, SYSTEMS, AND APPARATUS FOR CONDUCTING A CALIBRATION OPERATION FOR A PLURALITY OF MASS FLOW CONTROLLERS (MFCS) OF A SUBSTRATE PROCESSING SYSTEM

(71) Applicant: Applied Materials, Inc., Santa Clara, CA (US)

(72) Inventors: Bindusagar Marath Sankarathodi, San Jose, CA (US); Zhiyuan Ye, San Jose, CA (US); Jyothi Rajeevan, Bangalore (IN); Ala Moradian, Sunnyvale, CA (US); Zuoming Zhu, Sunnyvale, CA (US); Errol Antonio C. Sanchez, Tracy, CA (US); Patricia M. Liu, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 441 days.

(21) Appl. No.: 18/223,977

(22) Filed: Jul. 19, 2023

(65) Prior Publication Data

US 2023/0366715 A1 Nov. 16, 2023

Related U.S. Application Data

(63) Continuation of application No. 17/229,737, filed on Apr. 13, 2021, now Pat. No. 11,733,081.

(51) Int. Cl.
*G01F 15/00* (2006.01)
*G01F 25/17* (2022.01)

(52) U.S. Cl.
CPC ............ *G01F 15/002* (2013.01); *G01F 25/17* (2022.01)

(58) Field of Classification Search
None
See application file for complete search history.

(56) References Cited

U.S. PATENT DOCUMENTS 6,389,364 B1 5/2002 Vyers
8,707,754 B2 4/2014 Cruse et al.
(Continued)

FOREIGN PATENT DOCUMENTS

EP 2972630 B1 1/2019
JP 2003504748 A 2/2003
(Continued)

OTHER PUBLICATIONS

Japanese Office Action from Application No. 2024-095690 mailed Aug. 12, 2025.
(Continued)

*Primary Examiner* — Mark A Shabman
(74) *Attorney, Agent, or Firm* — Patterson + Sheridan, LLP

(57) ABSTRACT

Aspects generally relate to methods, systems, and apparatus for conducting a calibration operation for a plurality of mass flow controllers (MFCs) of a substrate processing system. In one aspect, a corrected flow curve is created for a range of target flow rates across a plurality of setpoints. In one implementation, a method of conducting a calibration operation for a plurality of mass flow controllers (MFCs) of a substrate processing system includes prioritizing the plurality of MFCs for the calibration operation. The prioritizing includes determining an operation time for each MFC of the plurality of MFCs, and ranking the plurality of MFCs in a rank list according to the operation time for each MFC. The method includes conducting the calibration operation for the plurality of MFCs according to the rank list and during an idle time for the substrate processing system.

20 Claims, 5 Drawing Sheets

(56) References Cited

U.S. PATENT DOCUMENTS

| | | | | |
|---|---|---|---|---|
| 2004/0050326 | A1* | 3/2004 | Thilderkvist | C23C 16/45574 156/345.33 |
| 2004/0250600 | A1 | 12/2004 | Bevers et al. | |
| 2004/0261492 | A1 | 12/2004 | Zarkar et al. | |
| 2006/0212233 | A1* | 9/2006 | Wong | G01F 25/15 702/50 |
| 2011/0011183 | A1 | 1/2011 | Monkowski et al. | |
| 2011/0265549 | A1 | 11/2011 | Cruse et al. | |
| 2013/0327422 | A1 | 12/2013 | Stainer et al. | |
| 2017/0299420 | A1 | 10/2017 | Shiroyama et al. | |
| 2019/0332129 | A1 | 10/2019 | Rice et al. | |
| 2020/0042021 | A1 | 2/2020 | Somani | |
| 2020/0049547 | A1 | 2/2020 | Spyropoulos et al. | |
| 2021/0003461 | A1* | 1/2021 | Tarkoma | G01D 18/00 |
| 2021/0080313 | A1 | 3/2021 | Ye et al. | |

FOREIGN PATENT DOCUMENTS

| | | | |
|---|---|---|---|
| JP | 2005045210 | A | 2/2005 |
| JP | 4537393 | B2 | 6/2010 |
| JP | 2010210528 | A | 9/2010 |
| TW | 201538934 | A | 10/2015 |
| WO | 2004010234 | A2 | 1/2004 |
| WO | 2005123236 | | 12/2005 |
| WO | 2018043225 | A1 | 3/2018 |
| WO | 2020033188 | A1 | 2/2020 |
| WO | 2021050663 | A1 | 3/2021 |

OTHER PUBLICATIONS

European Search Report in related application EP 22788588 dated Jan. 17, 2025.

“Mass Flow Controller”, Horiba, https://www.horiba.com/en_en/fluid-measurement-and-control/, Link Accessible on Mar. 2, 2021, Last accessed Apr. 13, 2021.

PCT International Search Report and Written Opinion dated May 11, 2022, for International Application No. PCT/US2022/013165.

Office Action in related application KR 10-2023-7013158 dated Jul. 29, 2025.

Office Action from Taiwanese Patent Application No. 111103558, dated Jun. 15, 2026.

Eropean Office Action for EP Application No. 22788588.6 dated Jul. 29, 2026.

* cited by examiner

METHODS, SYSTEMS, AND APPARATUS FOR CONDUCTING A CALIBRATION OPERATION FOR A PLURALITY OF MASS FLOW CONTROLLERS (MFCS) OF A SUBSTRATE PROCESSING SYSTEM

CROSS-REFERENCE TO RELATED APPLICATIONS

This application is a continuation of, and claims the benefit of, U.S. patent application Ser. No. 17/229,737, filed Apr. 13, 2021, which is herein incorporated by reference in its entirety.

BACKGROUND

Field

Aspects generally relate to methods, systems, and apparatus for conducting a calibration operation for a plurality of mass flow controllers (MFCs) of a substrate processing system. In one aspect, a corrected flow curve is created for a range of target flow rates across a plurality of setpoints.

Description of the Related Art

Mass flow controllers (MFCs) used in substrate processing operations can involve several failures. For example, the MFCs can involve drift, leaking, and/or shift-on-zero. Drift involves an MFC no longer delivering the same mass flow rate at the same operating condition. Leaking involves an amount of flow flowing through the MFC when the MFC is set to an operating condition where no amount of flow should occur. Shift-on-zero involves the MFC indicating that there is an amount of flow flowing through the MFC when in fact there is no flow flowing through the MFC.

Attempts to address the above failures involve substantial expenditure of costs and personnel, substantial machine downtime, and substantial operational delays, and do not accurately account for the full range of operating flow rates at which the MFCs operate. Additionally, failure to address the failures can affect processing results (such as deposited film thickness and deposited film quality) which hinders device performance. Efforts to detect drift may not do so until properties of a processed substrate are measured. Efforts may also inaccurately measure or detect drift.

Therefore, there is a need for improved methods, systems, and apparatus that facilitate automatically correcting mass flow controllers (MFCs) to facilitate accurately correcting MFCs across operational flow rate ranges, reduced expenditures of costs and personnel, reduced machine downtime, and reduced operational delays.

SUMMARY

Aspects generally relate to methods, systems, and apparatus for conducting a calibration operation for a plurality of mass flow controllers (MFCs) of a substrate processing system. In one aspect, a corrected flow curve is created for a range of target flow rates across a plurality of setpoints. In one aspect, the calibration operation is used to automatically correct the plurality of MFCs.

In one implementation, a method of conducting a calibration operation for a plurality of mass flow controllers (MFCs) of a substrate processing system includes prioritizing the plurality of MFCs for the calibration operation. The prioritizing includes determining an operation time for each MFC of the plurality of MFCs, and ranking the plurality of MFCs in a rank list according to the operation time for each MFC. The method includes conducting the calibration operation for the plurality of MFCs according to the rank list and during an idle time for the substrate processing system. The calibration operation includes setting a first MFC to a flow mode to flow a gas through the first MFC at a target flow rate. The calibration operation includes directing the gas to a mass flow verifier, and stepping the target flow rate of the gas through a plurality of flow rates corresponding to a plurality of setpoints. The calibration operation includes verifying a measured flow rate of the gas at each of the plurality of setpoints using the mass flow verifier.

In one implementation, a non-transitory computer readable medium for conducting a calibration operation for a plurality of mass flow controllers (MFCs) of a substrate processing system, includes instructions that, when executed, cause a plurality of operations to be conducted. The plurality of operations include prioritizing the plurality of MFCs for the calibration operation. The prioritizing includes determining an operation time for each MFC of the plurality of MFCs, and ranking the plurality of MFCs in a rank list according to the operation time for each MFC. The plurality of operations include conducting the calibration operation for the plurality of MFCs according to the rank list and during an idle time for the substrate processing system. The calibration operation includes setting a first MFC to a flow mode to flow a gas through the first MFC at a target flow rate. The calibration operation includes directing the gas to a mass flow verifier, and stepping the target flow rate of the gas through a plurality of flow rates corresponding to a plurality of setpoints. The calibration operation includes verifying a measured flow rate of the gas at each of the plurality of setpoints using the mass flow verifier.

In one implementation, a substrate processing system includes a processing chamber that includes a processing volume. The substrate processing system includes a gas circuit coupled to the processing chamber. The gas circuit includes a plurality of mass flow controllers (MFCs), one or more delivery lines coupled between the processing chamber and the plurality of MFCs, and a diverter line coupled between the plurality of MFCs and a mass flow verifier. The substrate processing system includes a controller including instructions that, when executed, cause a plurality of operations to be conducted. The plurality of operations include prioritizing the plurality of MFCs for a calibration operation. The prioritizing includes determining an operation time for each MFC of the plurality of MFCs, and ranking the plurality of MFCs in a rank list according to the operation time for each MFC. The plurality of operations include conducting the calibration operation for the plurality of MFCs according to the rank list and during an idle time for the substrate processing system. The calibration operation includes setting a first MFC to a flow mode to flow a gas through the first MFC at a target flow rate. The calibration operation includes directing the gas to a mass flow verifier, and stepping the target flow rate of the gas through a plurality of flow rates corresponding to a plurality of setpoints. The calibration operation includes verifying a measured flow rate of the gas at each of the plurality of setpoints using the mass flow verifier.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects generally relate to methods, systems, and apparatus for conducting a calibration operation for a plurality of mass flow controllers (MFCs) of a substrate processing system. In one aspect, a corrected flow curve is created for a range of target flow rates across a plurality of setpoints.

Figure 1:
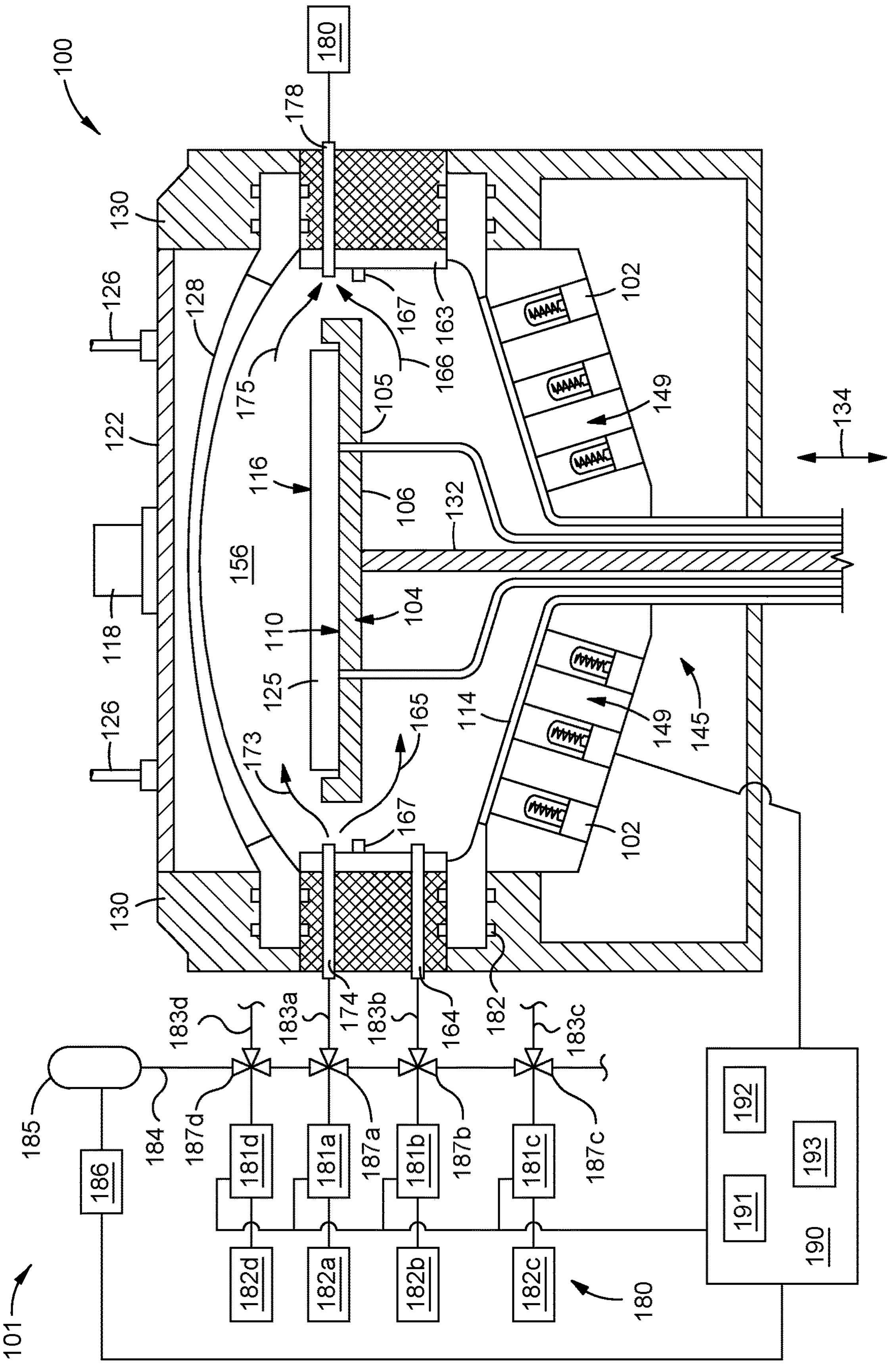
FIG. 1 is a schematic sectional view of a substrate processing system having a processing chamber, according to one implementation.

FIG. 1 is a schematic sectional view of a substrate processing system 101 having a processing chamber 100, according to one implementation. The processing chamber 100 is configured for epitaxial deposition processing operations. The processing chamber 100 may be used to process one or more substrates, including the epitaxial deposition of a material on an upper surface of a substrate 125. The processing chamber 100 may include an array of radiant heating lamps 102 for heating, among other components, a back side 104 of a substrate support 106 disposed within the processing chamber 100. The substrate support 106 may be a disk-like substrate support 106 as shown, or may be a ring-like substrate support (having a central opening), which supports the substrate from the edge of the substrate 125 to facilitate exposure of the substrate 125 to the thermal radiation of the lamps 102.

The substrate support 106 is located within the processing chamber 100 between an upper dome 128 and a lower dome 114. The upper dome 128, the lower dome 114 and a base ring 136 that is disposed between the upper dome 128 and lower dome 114 generally define an internal region of the processing chamber 100. The substrate 125 is transferred into the processing chamber 100 and is positioned onto the substrate support 106 through a loading port.

The substrate support 106 is supported by a central shaft 132, which moves the substrate 125 in a vertical direction 134 during loading and unloading, and in some instances, processing of the substrate 125. The substrate support 106 is shown in an elevated processing position in FIG. 1, but may be vertically traversed by an actuator coupled to the central shaft 732 to a loading position below the processing position. When lowered below the processing position, lift pins 105 contact the substrate 125 and raise the substrate 125 from the substrate support 706. A robot may then enter the processing chamber 100 to engage and remove the substrate 125 therefrom through the loading port. The substrate support 706 then may be actuated vertically to the processing position to place the substrate 125, with a device side 116 of the substrate 125 facing up, on a front side 110 of the substrate support 106.

The substrate support 106, while located in the processing position, divides the internal volume of the process chamber 100 into a processing volume 156 that is above the substrate 125, and a purge gas volume 158 below the substrate support 106. The substrate support 106 is rotated during processing by the central shaft 132 to minimize the effect of thermal and process gas flow spatial anomalies within the process chamber 100 and thus facilitate uniform processing of the substrate 125. The substrate support 106 may be formed from silicon carbide or graphite coated with silicon carbide to absorb radiant energy from the lamps 102 and conduct the radiant energy to the substrate 125. The central window portion of the upper dome 128 and the bottom of the lower dome 114 are formed from an optically transparent material such as quartz. The thickness and the degree of curvature of the upper dome 128 may be configured to provide a flatter geometry for uniform flow uniformity in the processing chamber 100.

The array of lamps 102 can be disposed adjacent to and beneath the lower dome 114 in a specified, optimal desired manner around the central shaft 132 to independently control the temperature at various regions of the substrate 125 as the process gas passes over, which facilitates the epitaxial deposition of a material onto the device side 116 (e.g., the upper surface) of the substrate 125. The deposited material may include gallium arsenide, gallium nitride, or aluminum gallium nitride. In one embodiment, which can be combined with other embodiments, an array of radiant heating lamps, such as the lamps 102, may be disposed over the upper dome 128.

The lamps 102 can be configured to include bulbs configured to heat the substrate 125 to a temperature within a range of about 200 degrees Celsius to about 1600 degrees Celsius. Each lamp 102 is coupled to a power distribution board through which power is supplied to each lamp 102. The lamps 102 are positioned within a lamphead 145 which may be cooled during or after processing by, for example, a cooling fluid introduced into channels 149 located between the lamps 102. The lamphead 145 conductively and radiatively cools the lower dome 114 due in part to the close proximity of the lamphead 145 to the lower dome 114. The lamphead 145 may also cool the lamp walls and walls of reflectors around the lamps 102. Alternatively, the lower dome 114 may be cooled by a convective approach. Depending upon the application, the lamphead 145 may or may not be in contact with the lower dome 114.

A circular shield 167 may be optionally disposed around the substrate support 106 and surrounded by a liner assembly 163. The shield 167 prevents or minimizes leakage of heat/light noise from the lamps 102 to the device side 116 of the substrate 125 while providing a pre-heat zone for the process gases. The shield 167 may be made from chemical vapor deposition (CVD) SiC, sintered graphite coated with SiC, grown SiC, opaque quartz, coated quartz, or any similar and suitable material that is resistant to chemical breakdown by process and purging gases.

The liner assembly 163 is sized to be nested within or surrounded by an inner circumference of the base ring 136. The liner assembly 163 shields the internal volume (e.g., the processing volume 156 and purge gas volume 158) from metallic walls of the processing chamber 100. While the liner assembly 163 is shown as a single body, the liner assembly 163 may include one or more liners with different configurations. As a result of backside heating of the substrate 625 from the substrate support 106, the use of an optical pyrometer 118 for temperature measurements/control on the substrate support 106 can be performed. This temperature measurement by the optical pyrometer 118 may also be done on the device side 116 of the substrate 125.

A reflector 122 may be optionally placed outside the upper dome 128 to reflect light that is radiating off the substrate 125 back onto the substrate 125. The reflector 122 may be secured to the upper dome 128 using a clamp ring 130. The reflector 122 can be made of a metal such as aluminum or stainless steel. The efficiency of the reflection can be improved by coating a reflector area with a highly reflective coating such as gold. The reflector 122 can have one or more channels 126 connected to a cooling source. The channels 126 connect to a passage formed on a side of the reflector 122 for cooling the reflector 122. The passage is configured to carry a flow of a fluid such as water and may run horizontally along the side of the reflector 122.

The substrate processing system 101 includes a gas circuit 180. The gas circuit 180 includes a plurality of mass flow controllers (MFCs) 181*a*-181*d*. Each of the MFCs 181*a*-181*d* is coupled to a respective gas source 182*a*-182*d* to supply a gas to the respective MFC 181*a*-181*d*. One or more delivery lines 183*a*-183*d* (four are shown) are coupled between the MFCs 181*a*-181*d* and the processing chamber 100 to supply gases from the MFCs 181*a*-181*d* and to the processing volume 156 and/or the purge gas volume 158. One or more diverter lines 184 (one is shown) are coupled between the MFCs 181*a*-181*d* and a mass flow verifier 186. The mass flow verifier 186 is coupled to the one or more diverter lines 184 through a storage tank 185. A plurality of valves 187*a*-187*d* are disposed along the one or more diverter lines 184 (one is shown, but a dedicated diverter line for each of valves 187*a*-187*d* is contemplated) and are coupled between the MFCs 181*a*-181*d* and the delivery lines 183*a*-183*d*. The valves 187*a*-187*d* can be three-way and/or four-way valves (three-way valves are shown). The valves 187*a*-187*d* are actuatable between a first position, a second position, and a third position. In the first position, the respective valve 187*a*-187*d* flows the gas from the respective MFC 181*a*-198*d* to the processing chamber 100. In the second position, the respective valve 187*a*-187*d* flows the gas from the respective MFC 181*a*-198*d* to the storage tank 185. In the third position, the respective valve 187*a*-187*d* blocks the gas from flowing to either the storage tank 185 or the processing chamber 100.

The MFCs 181*a*-181*d* deliver to the processing chamber 100 process gases (such as deposition gases, implantation gases, oxidation gases, etch gases, and/or dopant gases) and purge gases. The MFCS 181*a*-181*d* also control the flow rate of such gases. For example, the MFCs 181*a*-181*d* deliver and control the flow rates of gases that can include one or more of dinitrogen ($N_2$), hydrogen ($H_2$), hydrogen chloride (HCL), dichlorosilane (DCS), silane ($SiH_4$), methylsilane ($CH_3$—$SiH_3$), phosphine ($PH_3$), and/or diborane ($B_2H_6$). The present disclosure contemplates that other gases can be used.

As an example, a process gas is supplied from a first MFC 181*a* is introduced into the processing volume 156 through a first gas inlet 174 formed in the sidewall of the base ring 136. The first gas inlet 174 is configured to direct the process gas in a generally radially inward direction. During the epitaxial film formation process, the substrate support 106 may be located in the processing position, which is adjacent to and at about the same elevation as the first gas inlet 174, facilitating allowing the process gas to flow up and round along flow path 173 across the upper surface of the substrate 125 in a laminar flow. The process gas exits the processing volume 156 (along flow path 175) through a gas outlet 178 located on the side of the process chamber 100 opposite the first gas inlet 174. Removal of the process gas through the gas outlet 178 may be facilitated by a vacuum pump 180 coupled thereto. As the first gas inlet 174 and the gas outlet 178 are aligned with each other and disposed approximately at the same elevation, it is believed that such a parallel arrangement, when combined with an upper dome 128 enables a generally planar, uniform gas flow across the substrate 125. Further radial uniformity may be provided by the rotation of the substrate 125 through the substrate support 106.

As another example, a purge gas may be supplied from a second MFC 181*b* to the purge gas volume 158 through an optional second gas inlet 164 (or through the first gas inlet 174) formed in the sidewall of the base ring 136. The second gas inlet 164 is disposed at an elevation below the first gas inlet 174. If the circular shield 167 or a pre-heat ring is used, the circular shield or the pre-heat ring may be disposed between the first gas inlet 174 and the second gas inlet 164. In either case, the second gas inlet 164 is configured to direct the purge gas in a generally radially inward direction. During the epitaxial film formation process, the substrate support 106 may be located at a position such that the purge gas flows down and round along a flow path 165 across the back side 104 of the substrate support 106 in a laminar flow. Without being bound by any particular theory, the flowing of the purge gas is believed to facilitate preventing or substantially avoiding the flow of the process gas from entering into the purge gas volume 158, or to reduce diffusion of the process gas entering the purge gas region 158 (e.g., the region under the substrate support 106). The purge gas exits the purge gas volume 158 (along flow path 166) and is exhausted out of the processing chamber 100 through the gas outlet 178, which is located on the side of the processing chamber 100 opposite the second gas inlet 164.

Other MFCs of the gas circuit 180 (such as a third MFC 181*c* and a fourth MFC 181*d*) can be configured to introduce gases through the same first inlet 174 and/or the same second inlet 164, or can be configured to introduce gases through other gas inlets (such as a third gas inlet and/or a fourth gas inlet).

Although the processing chamber 100 is shown and described as an epitaxial deposition chamber, aspects of the present disclosure can be used in relation to other chambers and other substrate processing operations, such as chemical vapor deposition (CVD) chambers, atomic layer deposition (ALD) chambers, physical vapor deposition (PVD) chambers, etch chambers, ion implantation chambers, oxidation chambers, and/or other processing chambers.

The substrate processing system 101 includes a controller 190 coupled to the gas circuit 180. The controller 190 includes a central processing unit (CPU) 191, a memory 192 containing instructions, and support circuits 193 for the CPU 191. The controller 190 controls the MFCs 181*a*-181*d* of the gas circuit 180 directly, or via other computers and/or controllers. The controller 190 is of any form of a general-purpose computer processor that is used in an industrial setting for controlling various chambers and equipment, and sub-processors thereon or therein.

The memory 192, or non-transitory computer readable medium, is one or more of a readily available memory such as random access memory (RAM), read only memory (ROM), floppy disk, hard disk, flash drive, or any other form of digital storage, local or remote. The support circuits 193 are coupled to the CPU 191 for supporting the CPU 191 (a processor). The support circuits 193 include cache, power supplies, clock circuits, input/output circuitry and subsystems, and the like. Substrate processing parameters (such as a process recipe) and operations are stored in the memory 192 as a software routine that is executed or invoked to turn the controller 190 into a specific purpose controller to control the operations of the system 101, such as the gas circuit 180 and the processing chamber 100. The controller 190 is configured to conduct any of the methods described herein. The instructions stored on the memory 192, when executed, cause one or more of operations 302-324 of method 300 to be conducted.

The various operations described herein (such as the operations 302-324 of the method 300) can be conducted automatically using the controller 190, or can be conducted automatically or manually with certain operations conducted by a user.

The controller 190 is configured to conduct a calibration operation for the MFCs 181*a*-181*d*. The controller 190 prioritizes the plurality of MFCs 181*a*-181*d* for the calibration operation. The calibration operation for the MFCs 181-181*d* is conducted for one MFC 181*a*-181*d* at a time during idle times for the processing chamber 100. Idle times are times during which the substrate 125 is outside of the processing volume 156 of the processing chamber 100, such as before the substrate 125 is transferred into the processing chamber 100 and after the substrate 125 is removed from the processing chamber 100. During the calibration operation, the controller 190 sets an MFC 181-18*d* to a flow mode to flow a gas through the MFC 181*a*-181*d* at a target flow rate. The controller 190 instructs the corresponding valve 187*a*-187*d* to direct the gas to the storage tank 185 and the mass flow verifier 186. The controller 190 instructs the MFC 181*a*-191*d* to step the target flow rate of the gas through a plurality of flow rates corresponding to a plurality of setpoints. The plurality of flow rates corresponding to the plurality of setpoints can include a minimum flow rate and a maximum flow rate of a full operational range of the respective MFC 181*a*-181*d*. The plurality of flow rates corresponding to the plurality of setpoints can include a minimum flow rate and a maximum flow rate of a flow recipe. The plurality of flow rates can be stepped through in a decreasing order sequence, an increasing order sequence, and/or a random order sequence. The controller 190 instructs the mass flow verifier 186 to verify a measured flow rate of the gas diverted to the storage tank 185 at each of the plurality of setpoints. The present disclosure contemplates that the storage tank 185 can be omitted, and the mass flow verifier 186 can be coupled directly to the one or more diverter lines 185. In such an embodiment, the mass flow verifier 186 verifies the measured flow rate of the gas diverted in the one or more diverter lines 185 at each of the plurality of setpoints.

Stepping the target flow rate through the plurality of flow rates corresponding to the plurality of setpoints facilitates verifying a plurality of flow rates that can be used in a process recipe. The mass flow verifier 186 transmits the measured flow rate for each setpoint of the plurality of setpoints to the controller 190. For each setpoint of the plurality of setpoints, the controller 190 uses the measured flow rate to determine a flow ratio of the measured flow rate relative to the target flow rate, and determine a corrected flow rate that corrects the measured flow rate to be substantially equal to the target flow rate. The controller 190 determines the corrected flow rate for each setpoint by dividing the target flow rate by a correction factor. The controller 190 creates a corrected flow curve that includes the corrected flow rates across the plurality of setpoints. Using the corrected flow curve, a corrected flow rate can be identified (e.g., inferred) anywhere along the corrected flow curve, such as anywhere along the full operational range of the respective MFC 181*a*-181*d*. As an example, a second corrected flow rate corresponding to a second setpoint can be identified. The second corrected flow rate corresponding to the second setpoint is disposed along the corrected flow curve and is different than the plurality of setpoints such that the second setpoint was not used as one of the plurality of setpoints for verification. In one embodiment, which can be combined with other embodiments, the second setpoint is between two setpoints of the plurality of setpoints. In one embodiment, which can be combined with other embodiments, the second setpoint is outside of the plurality of setpoints.

A subsequent calibration can result in a second corrected flow curve for the same setpoint(s) included in the corrected flow curve and/or different setpoint(s) that are different than the setpoint(s) included in the corrected flow curve. In one example, which can be combined with other examples, the different setpoint(s) were not used during verification to generate the corrected flow curve. The second corrected flow curve, which includes corrected flow rates corresponding to the same setpoint(s) and/or the different setpoint(s), can be merged with the corrected flow curve to generate a new flow curve.

The controller 190 can compare the corrected flow rates across the plurality of setpoints to existing flow rate data gather by the controller 190 during a previous iteration of the calibration operation for the respective MFC 181*a*-181*d*.

The controller 190 can output and display on a display (such as a user interface) in the form of a graph and/or a table: the plurality of setpoints, the target flow rates across the plurality of setpoints, the measured flow rates across the plurality of setpoints, the flow ratios across the plurality of setpoints, and/or the corrected flow rates across the plurality of setpoints.

The instructions stored in the memory 192 of the controller 190 can include one or more machine learning/artificial intelligence algorithms that can be executed in addition to the operations described herein. As an example, a machine learning/artificial intelligence algorithm executed by the controller 190 can prioritize the MFCs 181*a*-181*d* for conducting the calibration operation. The controller 190 can monitor and store operational parameters, such as the operation time for each MFC 181*a*-181*d*, and rank the plurality of MFCs 181*a*-181*d* in a rank list according to the operation time for each MFC. The rank list can be continuously monitored and updated using the machine learning/artificial intelligence algorithm. The machine learning/artificial intelligence algorithm can account for previous operational parameters, such as flow rate changes and/or operational failures for the MFCs 181*a*-181*d*, to monitor and update the rank list. As another example, a machine learning/artificial intelligence algorithm executed by the controller 190 can select the plurality of setpoints and the end flow rate according to a process recipe and/or data recorded during previous processing operations using the process recipe or a different process recipe. The machine learning/artificial intelligence algorithm of the controller 190 can further monitor and store a process recipe previously used in the processing chamber 100, and the stored process recipe can be used by the machine learning/artificial intelligence algorithm to select the plurality of setpoints and the end flow rate.

The machine learning/artificial intelligence algorithm can prioritize the plurality of setpoints (which correspond to flow rates used in the process recipe) for use in the calibration operation according to a second rank list that ranks the plurality of setpoints.

Figure 2:
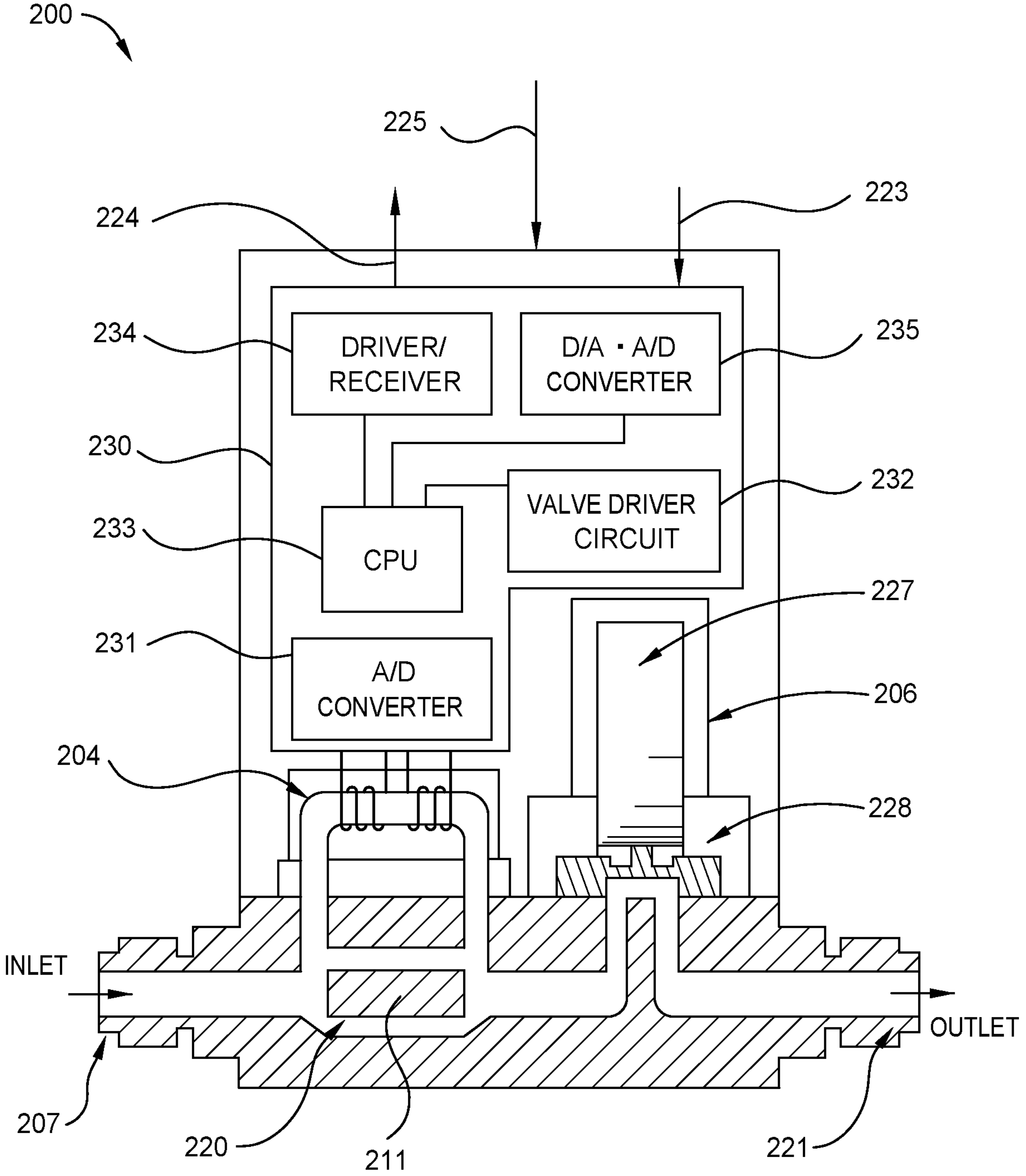
FIG. 2 is a schematic cross-sectional view of a mass flow controller (MFC), according to one implementation.

FIG. 2 is a schematic cross-sectional view of a mass flow controller (MFC) 200, according to one implementation. The MFC 200 can be used as each of the MFCs 181*a*-181*d* shown in FIG. 1. The MFC 200 receives gas from a gas source and through an inlet 207. The gas received through the inlet 207 encounters a flow restriction device 211 positioned in a bypass 220. A sensor device 204 is configured to measure a flow rate of the gas through the MFC 200. Once the gas has passed the sensor device 204 and/or the restriction device 211, then the gas encounters a flow rate control valve 206. After passing through the flow rate control valve 206, the gas flows through an outlet 221 and to one of the valves 181*a*-181*d*. The flow rate control valve 206 includes a piezo actuator 227 and a metal diaphragm 228.

The MFC 200 is coupled to the controller 190. The MFC 200 receives a flow rate input signal 223 (including, e.g., the target flow rate during the calibration operation) from the controller 190 and transmits a flow rate output signal 224 to the controller 190. The flow rate output signal 224 can be measured using the sensor device 204. The measured flow rates verified across the plurality of setpoints using the mass flow verifier 186 are different and separate from the flow rate output signal 224 measured using the sensor device 204. The MFC 200 receives a power supply 225 from a power source.

Due to drift or shift-on-zero, for example, measured flow rates verified using the mass flow verifier 186 can be more accurate for operational processing purposes than the flow rate output signals 224.

The MFC 200 includes a module 230. The module 230 includes an A/D converter 231 coupled to the sensor device 204, a valve driver circuit 232 coupled to the flow rate control valve 206, and a CPU 233. The module 230 also includes a driver/receiver 234 and a D/A-A/D converter 235.

Figure 3A:
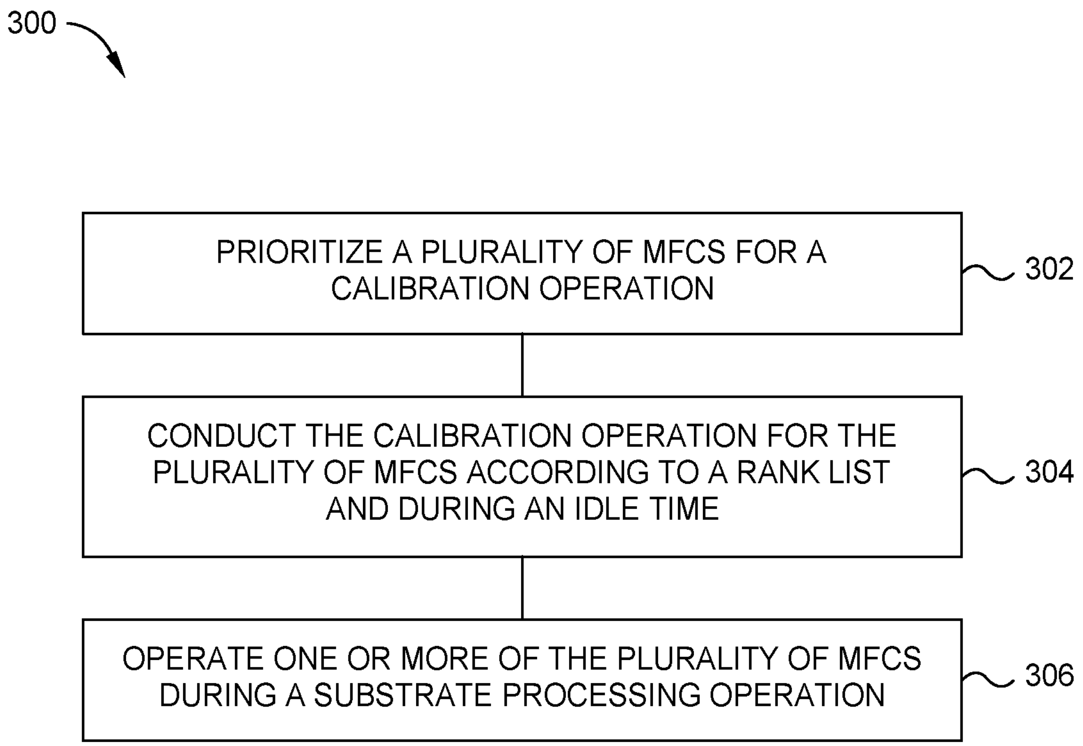
FIG. 3A is a schematic block diagram view of a method of conducting a calibration operation for a plurality of mass flow controllers (MFCs) of a substrate processing system, according to one implementation.

FIG. 3A is a schematic block diagram view of a method 300 of conducting a calibration operation for a plurality of mass flow controllers (MFCs) of a substrate processing system, according to one implementation. Operation 302 of the method 300 includes prioritizing the plurality of MFCs for the calibration operation. The prioritizing of operation 302 includes determining an operation time for each MFC of the plurality of MFCs, and ranking the plurality of MFCs in a rank list according to the operation time for each MFC. The operation time for each MFC is a total time for which the respective MFC is set to a flow mode since a previous calibration for the respective MFC. The operation time of each MFC of the plurality of MFCs is ranked in the rank list from a maximum operation time down to a minimum operation time.

The present disclosure contemplates that a user can manually select a subset of the plurality of MFCs for the calibration operation.

Operation 304 of the method 300 includes conducting the calibration operation for the plurality of MFCs according to the rank list and during an idle time for the substrate processing system. The idle time is a time during which a substrate is outside of a processing volume of a processing chamber of the substrate processing system. The calibration operation is conducted according to the rank list such that the calibration operation is conducted on the first MFC corresponding to the maximum operation time prior to the other MFCs of the plurality of MFCs. After the calibration operation is conducted for the first MFC, the calibration operation is conducted for one or more of the other MFCs during the idle time or one or more additional idle times. Conducting the calibration operation across the plurality of MFCs is prioritized and is staggered across a plurality of idle times, and the plurality of idle items can be separated by different stages of a substrate processing operation and/or different substrates on which the substrate processing operation is conducted.

The calibration operation of operation 304 can be conducted (e.g., triggered) at operational intervals. In one embodiment, which can be combined with other embodiments, the operational intervals are substrate count intervals, such as every 1,000 substrates processed. In one embodiment, which can be combined with other embodiments, the operational intervals are idle time intervals, such as occurrences where the idle time exceeds 30 minutes. The calibration operation can also be conducted (e.g., triggered) by analyzing existing correction flow rates (from previous iterations of the calibration operation) for a respective MFC and predicting a drift of the respective MFC. The analyzing and the predicting can be conducted by the machine learning/artificial intelligence algorithm of the controller 190.

Figure 3B:
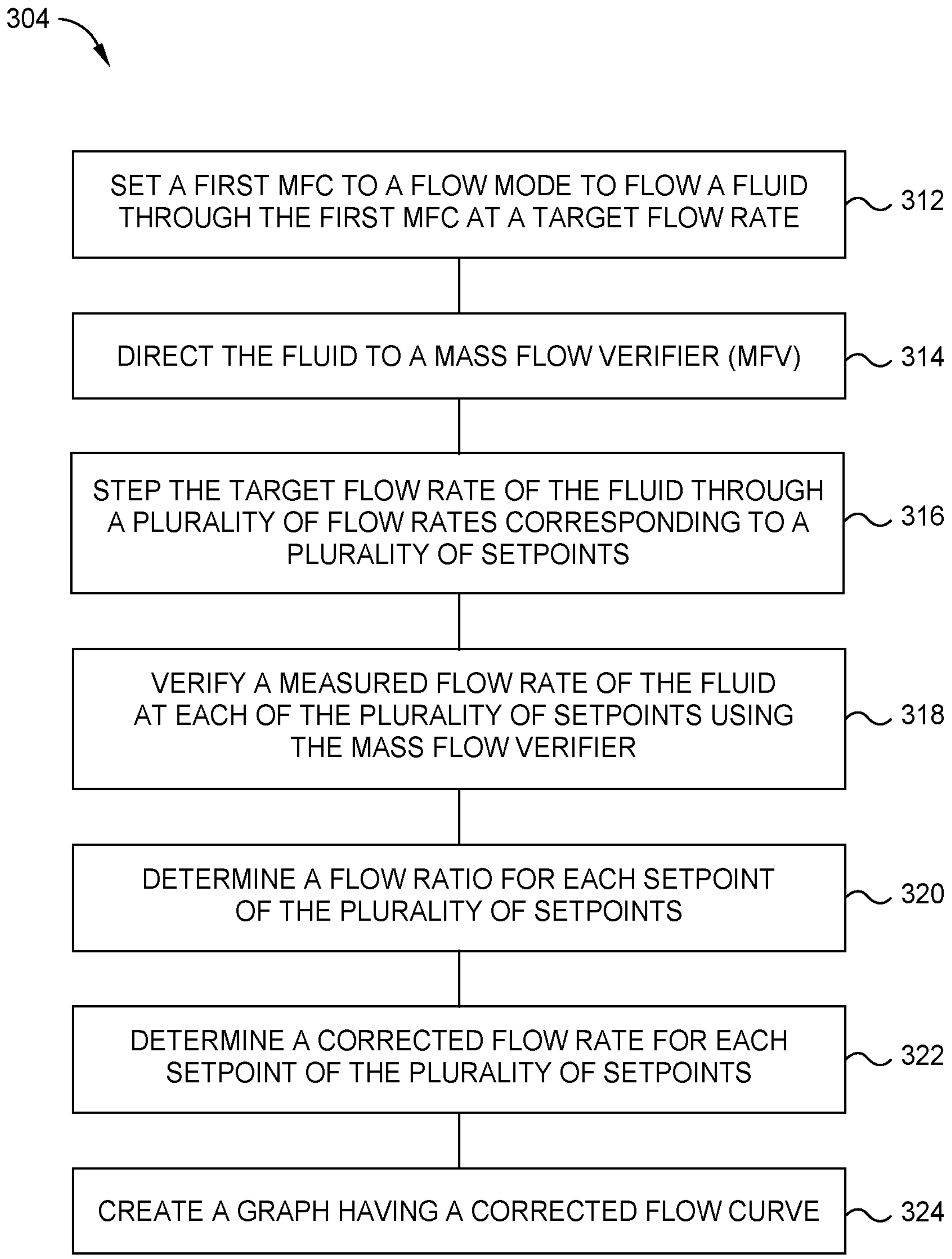
FIG. 3B is a schematic block diagram view of the conducting the calibration operation of the operation shown in FIG. 3A, according to one implementation.

FIG. 3B is a schematic block diagram view of the conducting the calibration operation of the operation 304 shown in FIG. 3A, according to one implementation. The calibration operation is first conducted on a first MFC of the rank list. The operations 312-324 of the calibration operation can be repeated for each MFC of the plurality of MFCs, one-by-one and in the order of the rank list, during one or more idle times for the machine.

Operation 312 includes setting the first MFC of the plurality of MFCs to a flow mode to flow a gas through the first MFC at a target flow rate.

Operation 314 includes directing the gas to a mass flow verifier. Operation 316 includes stepping the target flow rate of the gas through a plurality of flow rates corresponding to a plurality of setpoints. The plurality of flow rates corresponding to the plurality of setpoints can include a minimum flow rate and a maximum flow rate of a full operational range of the first MFC. The plurality of flow rates corresponding to the plurality of setpoints can include a minimum flow rate and a maximum flow rate of a flow recipe. The plurality of flow rates can be stepped through in a decreasing order sequence, an increasing order sequence, and/or a random order sequence.

Operation 318 includes verifying a measured flow rate of the gas at each of the plurality of setpoints using the mass flow verifier. The end flow rate and the plurality of setpoints can be selected by a user, or can be selected by a controller (such as the controller 190). In one embodiment, which can be combined with other embodiments, the setpoints and the end flow rate correspond to (e.g., are selected according to) a plurality of stages of a process recipe used for the respective first MFC during a processing operation (such as an epitaxial deposition operation). In one embodiment, which can be combined with other embodiments, operation 302 includes prioritizing the plurality of setpoints (which correspond to flow rates used in the process recipe) for each MFC for use in the calibration operation. The plurality of setpoints are prioritized according to a second rank list that ranks the plurality of setpoints. The second rank list can rank the plurality of setpoints based on how often the setpoints are used and/or how recently the setpoints were used.

Operation 320 includes, for each setpoint of the plurality of setpoints, determining a flow ratio between the measured flow rate and the target flow rate. Operation 322 includes, for each setpoint of the plurality of setpoints, determining a corrected flow rate that corrects the measured flow rate to be substantially equal to the target flow rate. If drift occurs for the first MFC, the corrected flow rate corrects for the drift by correcting the actual flow rate (the measured flow rate) to be substantially equal to the target flow rate. The flow ratio for each setpoint is a ratio determined by dividing the measured flow rate by the target flow rate. The corrected flow rate for each setpoint is determined by dividing the target flow rate by a correction factor. In one embodiment, which can be combined with other embodiments, the correction factor is equal to the flow ratio (the ratio). The correction factor for each setpoint can be plotted in a multi-point curve. In one embodiment, which can be combined with other embodiments, the correction factor is an average of the flow ratio and one or more existing ratios that have been calculated in one or more previous iterations of the calibration operation for the first MFC.

Flow ratio(s) determined can be ignored (e.g., excluded from correction factor determinations) and deleted and/or correction factors equal to the flow ratios can be ignored and deleted (e.g., not used during operation of the first MFC) if outside of a first acceptance range or within a second acceptance range that is narrower than the first acceptance range. The flow ratio(s) and/or the correction factors are accepted if within of a first acceptance range and outside of a second acceptance range. In one example, which can be combined with other examples, the first acceptance range is 0.7 to 1.3. In one example, with can be combined with other examples, the second acceptance range is 0.995 to 1.005. Other first and second acceptance ranges are contemplated. The first and second acceptance ranges can be set by a user and/or can be determined, for example by the machine learning/artificial intelligence algorithm. The first and second acceptance ranges can be determined by conducting historical deviation operations on existing flow ratio data and/or existing correction factor data from previous iterations of the calibration operation. If the flow ratio(s) are outside of the first acceptance range or within the second acceptance range, then an alert can be generated and sent to a user, such as by sending the alert to a display. The alert can indicate that certain flow ratio(s) are outside of the first acceptance range or within the second acceptance range.

Operation 324 includes creating a graph having a corrected flow curve. The creating the graph includes plotting the corrected flow rate for each setpoint of the plurality of setpoints in the graph. The creating the graph also includes connecting the corrected flow rate for each setpoint of the plurality of setpoints in the graph using smooth curve fitting to create the corrected flow curve for the first MFC. The graph can also include an existing flow curve for the first MFC that was created from a previous iteration of the calibration operation. The corrected flow curve can be compared to the existing flow curve, and either accepted or rejected. If accepted, the corrected flow curve is merged with the existing flow curve to generate a new flow curve by weighing and averaging the corrected flow curve and the existing flow curve.

The weighing and averaging of the corrected flow curve and the existing flow curve involves assigning a weight to the corrected flow rates of the corrected flow curve and existing flow rates of the existing flow curve prior to conducting the averaging. The assigned weights can take into account the durational age of the existing flow rates and a ratio of the corrected flow rate relative to the existing flow rate at the respective setpoint. The present disclosure contemplates that the corrected flow rate of a respective MFC can be ignored (e.g., excluded from the averaging) and deleted if outside of a first acceptance range of 0.7 to 1.3 or within a second acceptance range of 0.995 to 1.005. The corrected flow rate is accepted if the ratio is within the first acceptance range and outside of the second acceptance range. Other first and second acceptance ranges are contemplated. The first and second acceptance ranges can be set by a user and/or can be determined, for example by the machine learning/artificial intelligence algorithm. The first and second acceptance ranges can be determined by conducting historical deviation operations on existing ratio data from previous iterations of the calibration operation. If the ratio is outside of the first acceptance range or within the second acceptance range, then an alert can be generated and sent to a user, such as by sending the alert to a display. The alert can indicate that the ratio is outside of the first acceptance range or within the second acceptance range. The user can select whether to delete the ratio that is outside of the first acceptance range or within the second acceptance range.

In one embodiment, which can be combined with other embodiments, the corrected flow curve (if accepted) is merged with a global correction factor across the plurality of setpoints by weighing and averaging the correction factor at each setpoint with the global correction factor. The global correction factor can be determined using a previous single setpoint calibration operation that is similar to the calibration operation of operation 304.

If accepted, the new flow curve can be used for operating the respective MFC. If the corrected flow curve is different from the existing flow curve, then the corrected flow curve can be rejected. If the corrected flow curve is rejected, then the existing flow curve can be used for operating the respective MFC. If the corrected flow curve is accepted and there is no existing flow curve, then the corrected flow curve can be used for operating the respective MFC.

The corrected flow curve, the existing low curve, and/or the new flow curve can be output and displayed on a display (such as a user interface) in the form of a graph and/or a table.

Referring to FIG. 3A, operation 306 of the method 300 includes operating one or more of the plurality of MFCs (such as the first MFC) during a substrate processing operation (such as an epitaxial deposition operation). Each MFC operated is operated according to the new flow curve (if selected), the corrected flow curve (if selected), the existing flow curve (if selected), or the global correction factor (if selected). The one or more of the plurality of MFCs is operated while the substrate processing operation is conducted at a temperature that is within a range of 200 degrees Celsius to 800 degrees Celsius. The respective MFC is operated across operational setpoints using corrected flow rates corresponding to the operational setpoints. The corrected flow rates are disposed along one of the curves (depending on which curve is selected for). A corrected flow rate can be identified anywhere along the corrected flow curve, such as anywhere along the full operational range of the respective MFC. As an example, a second corrected flow rate corresponding to a second setpoint can be identified. The second setpoint can be one of the operational setpoints. The second corrected flow rate corresponding to the second setpoint is disposed along the corrected flow curve and is different than the plurality of setpoints such that the second setpoint was not used as one of the plurality of setpoints for verification. In one embodiment, which can be combined with other embodiments, the second setpoint is between two setpoints of the plurality of setpoints. In one embodiment, which can be combined with other embodiments, the second setpoint is outside of the plurality of setpoints.

The present disclosure contemplates that the corrected flow curve (having corrected flow rates) and/or the new flow curve (having new flow rates) can be generated and stored in memory in a data gathering mode without yet implementing the corrected flow curve and/or the new flow curve in operation of the respective MFC during the substrate processing operation.

Figure 4:
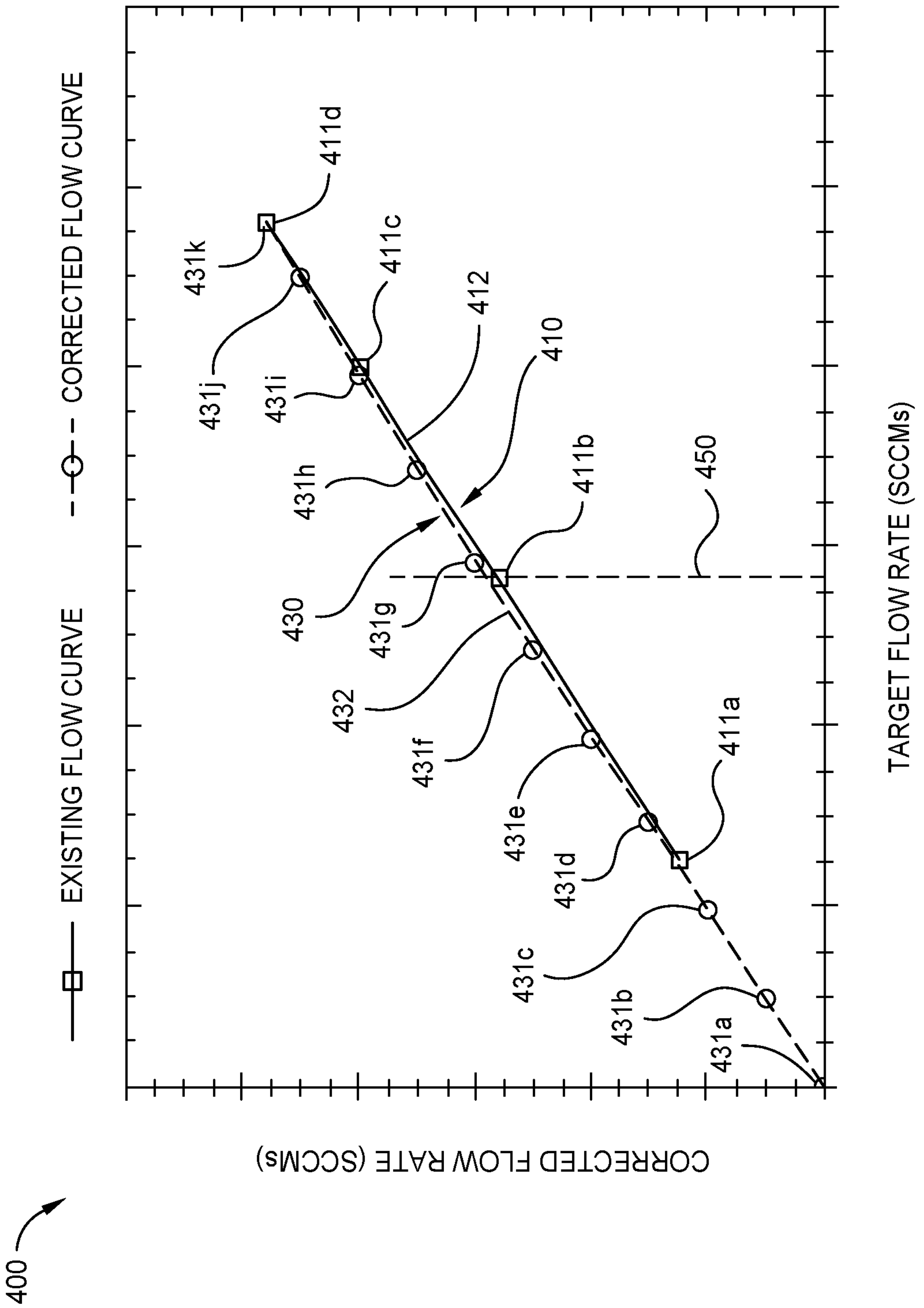
FIG. 4 is a schematic view of a graph, according to one implementation.

FIG. 4 is a schematic view of a graph 400, according to one implementation. An X-axis of the graph 400 includes target flow rates (in standard cubic centimeters per minute (SCCMs)) and a Y-axis of the graph 400 includes corrected flow rates (in SCCMs). An existing flow curve 410 and a corrected flow curve 430 are plotted in the graph 400. The existing flow curve 410 includes a plurality of setpoints 411*a*-411*d* and a curved fitting line 412 extending through the setpoints 411*a*-411*d* using smooth curve fitting. The corrected flow curve 430 includes a plurality of setpoints 431*a*-431*k* and a curved fitting line 432 extending through the setpoints 431*a*-431*k* using smooth curve fitting.

The present disclosure contemplates that the merging of the corrected flow curve 430 and the existing flow curve 410 (as discussed in relation to operation 324 of the method 300) by weighing and averaging can involve merging a particular setpoint at a particular target flow rate with a point along one of the curved fitting lines 412, 432 that is disposed at the particular target flow rate. As an example, the existing flow rate at the setpoint 411*b* can be weighed and averaged with a corrected flow rate disposed along the curved fitting line 432 that is vertically aligned with the setpoint 411*b* along a vertical axis 450 disposed at the target flow rate of the setpoint 411*b*. The existing flow rate at the setpoint 411*b* can be weighed and averaged with the corrected flow rate disposed along the curved fitting line 432 to calculate a new corrected flow rate at the setpoint 411*b*.

Benefits of the present disclosure include automatically correcting mass flow controllers (MFCs) in an in-line process, accurately correcting MFCs across operational flow rate ranges, reduced likelihood or over-correction and under-correction, modularity of application to various MFCs, reduced expenditures of costs and personnel, reduced machine downtime, reduced operational delays, accurate deposition and enhanced deposition uniformity, and increased throughput.

As an example, the calibration of MFCs one-by-one during idle times and prioritizing the plurality of MFCs for the calibration operation facilitates reduced machine downtime and increased throughput. As another example, the merging of the corrected flow curve (having the corrected flow rates) with the existing flow curve (having the existing flow rates) facilitates accurate calibration and correction of MFCs. It is believed that such aspects facilitate unexpected results with respect to increased efficiency, increased throughput, and reduced machine downtime.

It is contemplated that one or more aspects disclosed herein may be combined. As an example, one or more aspects, features, components, and/or properties of the substrate processing system 101, the MFC 200, the method 300, the operation 304, and/or the graph 400 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof. The present disclosure also contemplates that one or more aspects of the embodiments described herein may be substituted in for one or more of the other aspects described. The scope of the disclosure is determined by the claims that follow.

What is claimed is:

1. A method of conducting a calibration operation on a plurality of mass flow controllers of a substrate processing system, the method comprising:
- selecting a first mass flow controller from the plurality of mass flow controllers according to a prioritized rank list of the plurality of mass flow controllers, the prioritized rank list being based on an operation time of each mass flow controller of the plurality of mass flow controllers; and
- calibrating the first mass flow controller by:
  - flowing a gas through the first mass flow controller at a target flow rate;
  - stepping the target flow rate of the gas through a plurality of flow rates corresponding to a plurality of setpoints; and
  - verifying a measured flow rate of the gas at each of the plurality of setpoints using a mass flow verifier.

2. The method of claim 1, further comprising updating the prioritized rank list to account for a flow rate change or an operational failure of a mass flow controller of the plurality of mass flow controllers.

3. The method of claim 1, further comprising selecting the plurality of setpoints according to a process recipe.

4. The method of claim 3, wherein the plurality of setpoints are selected based on data recorded during a processing operation involving the process recipe.

5. The method of claim 3, wherein each setpoint of the plurality of setpoints corresponds to a flowrate of the gas in the process recipe.

6. The method of claim 5, further comprising:
- generating a further prioritized rank list of the plurality of setpoints; and
- wherein stepping the target flow rate of the gas through the plurality of flow rates is performed according to the further prioritized rank list.

7. The method of claim 1, further comprising:
- selecting a second mass flow controller of the plurality of mass flow controllers according to the prioritized rank list; and
- calibrating the second mass flow controller.

8. A method of conducting a calibration operation on a plurality of mass flow controllers of a substrate processing system, the method comprising:
- selecting a first mass flow controller from the plurality of mass flow controllers according to a rank list of the plurality of mass flow controllers that is prioritized based on an operation time of each mass flow controller; and
- calibrating the first mass flow controller by:
  - flowing a gas through the first mass flow controller at a target flow rate;
  - stepping the target flow rate of the gas through a plurality of flow rates corresponding to a plurality of setpoints;
  - verifying a measured flow rate of the gas at each of the plurality of setpoints using a mass flow verifier; and
  - for each setpoint:
    - determining a flow ratio of the measured flow rate relative to the target flow rate, and determining a corrected flow rate that corrects the measured flow rate.

9. The method of claim 8, further comprising:

using the corrected flow rate for each setpoint to predict a drift of the first mass flow controller; and based on the drift, initiating a repeat of the calibrating of the first mass flow controller.

10. A method of conducting a calibration operation on a plurality of mass flow controllers of a substrate processing system, the method comprising:

monitoring an operational parameter of each mass flow controller of the plurality of mass flow controllers;

generating a prioritized rank list of the plurality of mass flow controllers according to the operational parameter;

selecting a first mass flow controller from the plurality of mass flow controllers according to the prioritized rank list of the plurality of mass flow controllers; and calibrating the first mass flow controller by:

flowing a gas through the first mass flow controller at a target flow rate;

stepping the target flow rate of the gas through a plurality of flow rates corresponding to a plurality of setpoints;

verifying a measured flow rate of the gas at each of the plurality of setpoints using a mass flow verifier; and for each setpoint of the plurality of setpoints:

determining a flow ratio of the measured flow rate relative to the target flow rate; and determining a corrected flow rate that corrects the measured flow rate;

wherein the corrected flow rate is determined by dividing the target flow rate by a correction factor; and the correction factor is equal to one of:

the flow ratio; or an average of the flow ratio and one or more previous flow ratios, the one or more previous flow ratios resulting from one or more previous calibrations of the first mass flow controller.

11. The method of claim 10, further comprising performing the calibrating of the first mass flow controller during an idle time of the substrate processing system.

12. The method of claim 10, further comprising updating the prioritized rank list to account for a flow rate change or an operational failure of a mass flow controller of the plurality of mass flow controllers.

13. The method of claim 10, wherein for each setpoint of the plurality of setpoints, the method further comprises:

performing a comparison of the flow ratio with a first acceptance range and a narrower second acceptance range.

14. The method of claim 13, wherein for each setpoint of the plurality of setpoints, the method further comprises determining the first and second acceptance ranges based on previous flow ratios or correction factors resulting from one or more previous calibrations of the first mass flow controller.

15. The method of claim 10, further comprising:

plotting the corrected flow rate for each setpoint of the plurality of setpoints in a graph, and connecting the corrected flow rate for each setpoint of the plurality of setpoints in the graph using smooth curve fitting to create a first corrected flow curve for the first mass flow controller.

16. The method of claim 15, further comprising:

comparing the first corrected flow curve with a second corrected flow curve for the first mass flow controller, the second corrected flow curve resulting from a previous calibration of the first mass flow controller; and generating a third corrected flow curve by weighing and averaging the first corrected flow curve and the second corrected flow curve.

17. The method of claim 15, further comprising adjusting the first corrected flow curve using a global correction factor to create a second corrected flow curve.

18. A method of conducting a calibration operation on a plurality of mass flow controllers of a substrate processing system, the method comprising:

generating a prioritized rank list of a plurality of setpoints, each setpoint of the plurality of setpoints corresponding to a flow rate of a gas in a process recipe;

selecting a first mass flow controller from the plurality of mass flow controllers according to a prioritized rank list of the plurality of mass flow controllers; and calibrating the first mass flow controller by:

flowing the gas through the first mass flow controller at a target flow rate;

stepping the target flow rate of the gas through a plurality of flow rates according to the prioritized rank list of the plurality of setpoints; and verifying a measured flow rate of the gas at each of the plurality of setpoints using a mass flow verifier.

19. A method of conducting a calibration operation on a plurality of mass flow controllers of a substrate processing system, the method comprising:

monitoring an operational parameter of each mass flow controller of the plurality of mass flow controllers;

generating a prioritized rank list of the plurality of mass flow controllers according to the operational parameter;

selecting a first mass flow controller from the plurality of mass flow controllers according to the prioritized rank list of the plurality of mass flow controllers; and calibrating the first mass flow controller by:

flowing a gas through the first mass flow controller at a target flow rate;

stepping the target flow rate of the gas through a plurality of flow rates corresponding to a plurality of setpoints;

verifying a measured flow rate of the gas at each of the plurality of setpoints using a mass flow verifier; and for each setpoint of the plurality of setpoints:

determining a flow ratio of the measured flow rate relative to the target flow rate;

determining a corrected flow rate that corrects the measured flow rate;

determining a first acceptance range and a narrower second acceptance range based on previous flow ratios or correction factors resulting from one or more previous calibrations of the first mass flow controller; and performing a comparison of the flow ratio with the first and second acceptance ranges.

20. A method of conducting a calibration operation on a plurality of mass flow controllers of a substrate processing system, the method comprising:

monitoring an operational parameter of each mass flow controller of the plurality of mass flow controllers;

generating a prioritized rank list of the plurality of mass flow controllers according to the operational parameter;

selecting a first mass flow controller from the plurality of mass flow controllers according to the prioritized rank list of the plurality of mass flow controllers; and calibrating the first mass flow controller by:

flowing a gas through the first mass flow controller at a target flow rate;

stepping the target flow rate of the gas through a plurality of flow rates corresponding to a plurality of setpoints;

verifying a measured flow rate of the gas at each of the plurality of setpoints using a mass flow verifier;

for each setpoint of the plurality of setpoints:

determining a flow ratio of the measured flow rate relative to the target flow rate;

determining a corrected flow rate that corrects the measured flow rate; and plotting the corrected flow rate in a graph;

connecting the corrected flow rate for each setpoint of the plurality of setpoints in the graph using smooth curve fitting to create a first corrected flow curve for the first mass flow controller;

comparing the first corrected flow curve with a second corrected flow curve for the first mass flow controller, the second corrected flow curve resulting from a previous calibration of the first mass flow controller; and generating a third corrected flow curve by weighing and averaging the first corrected flow curve and the second corrected flow curve.

* * * * *